United States Patent [19]
Baker

[11] 3,910,364
[45] Oct. 7, 1975

[54] TRAILER DUMPING AND WEIGHING SYSTEM

[75] Inventor: Charles J. Baker, Portland, Oreg.

[73] Assignee: Royal Industries, Inc., Pasadena, Calif.

[22] Filed: Jan. 20, 1975

[21] Appl. No.: 542,282

[52] U.S. Cl. ................................. 177/145; 214/47
[51] Int. Cl.² .................. G01G 19/00; B65G 67/24
[58] Field of Search ...... 177/145, 146; 214/2, 44 C, 214/47

[56] References Cited
UNITED STATES PATENTS

| | | | |
|---|---|---|---|
| 2,605,096 | 7/1952 | Bradley | 177/145 X |
| 3,190,472 | 6/1965 | Nash et al. | 214/47 |
| 3,476,269 | 11/1969 | Baker et al. | 214/2 |
| 3,539,029 | 11/1970 | Porter, Jr. et al. | 177/145 |

FOREIGN PATENTS OR APPLICATIONS

| | | | |
|---|---|---|---|
| 886,227 | 8/1953 | Germany | 177/145 |

Primary Examiner—George H. Miller, Jr.
Attorney, Agent, or Firm—Klarquist, Sparkman, Campbell, Leigh, Hall & Whinston

[57] ABSTRACT

A trailer dumping and weighing system wherein electronic load cells weighing apparatus is employed in combination with a trailer dumper or lift. In one embodiment the pivot end of the lift is hingedly attached to and supported by load cells having both a tension load sensing capacity and a compression load sensing capacity, with hydraulic cylinders and pistons used to tilt the lift being supported upon load cells having a compression load sensing capacity. In another embodiment a weighbridge is supported at its back end by tension-compression load cells and at its front end by compression load cells, with a trailer lift above the weighbridge being hingedly attached to one end of the weighbridge and with hydraulic cylinders and pistons for tilting the lift being supported on the weighbridge at the other end thereof. Using the system, a trailer may be weighed before and after dumping with the same support elements utilized in both dumping and weighing to eliminate clearance requirements during the weighing operation.

19 Claims, 9 Drawing Figures

TRAILER DUMPING AND WEIGHING SYSTEM

BACKGROUND OF THE INVENTION

This invention relates to an apparatus for weighing and dumping loaded vehicles such as truck trailers.

Truck trailers and other carriers used to haul wood chips and like materials employ specialized dumping equipment to empty the trailers. Conventional dumping equipment is a pivotable or tiltable lift onto which the trailer is driven. After the truck is disengaged from the trailer, the lift is tilted to empty or dump the contents of the trailer over the rear end of the lift. It is often desirable to weigh a trailer before and after dumping to determine the weight of the load which has been dumped. Conventionally, weighing before and after dumping has been accomplished by weighing the loaded vehicle on a separate vehicle scale, driving the vehicle onto a lift and dumping the load from the vehicle, and then driving the unloaded vehicle back onto the vehicle scale for reweighing. Such separate weighing and dumping operations are wasteful of time and space. More recently the weighing operation and dumping operation have been combined into a simple combination system. Such a combination system is described in U.S. Pat. No. 3,476,269, issued to Charles J. Baker and Frederick S. Van Raden.

While the combination of the weighing and dumping operations into one system has many advantages over conventional, separate weighing and dumping operations, problems still exist in providing an economical and accurate system for weighing and dumping trailers. One of the primary problems has been the unavoidable requirement for substantial clearance between support elements utilized to support a trailer during dumping operations and other support elements used to support the trailer during weighing operations. When the trailer is being weighed by combined weighing and dumping apparatus, the trailer and lift must not be partially supported upon the dumping support elements of the lift, for example a hinge or pivot element used to support and tilt the lift during dumping. If any portion of the weight of the lift and trailer were carried by such a hinge element (e.g. a trunnion and pin) during the weighing operation, an inaccurate, low weight would be read out. This is because the hinge element has been separately supported and disconnected from the weighing device employed. It is also necessary that the lift and trailer be fully supported by the pivot or hinge element during the dumping operation to ensure a safe and stable dumping system. Thus, clearance between, for example, the pin and trunnion in the hinge element of a lift must be provided in prior art weighing-dumping systems to ensure that the pin does not rest on the trunnion during weighing in order to obtain an accurate weight for the trailer on a combination system.

The necessity for clearance between certain elements in prior combination weighing-dumping apparatus is undesirable for several reasons. The parts of the system where clearance is maintained during weighing are found to wear more rapidly than other parts of the system. Operation of the system is also undesirably difficult, since the hinge elements must be checked by the operator for clearance each time a weight is to be obtained.

An additional drawback found in previously used weighing-dumping combination systems has been inaccurate weighing due to a badly placed center of gravity on the lift. Inaccurate weighing can occur in combination systems when the center of gravity of a loaded trailer on the lift is not between the front and rear support elements of the lift, causing a moment force on the lift about one of the support elements. This, in turn, causes tensional loading and distortion in the weight sensing of a conventional scale when used with the lift.

Electronic load cells are in the nature of strain gauges and are known in the art for use in weighing, e.g., in truck scales and the like. Such cells operate on the principal that changes in the load on a cell proportionally change the resistance of the cell to an electric current passed through it. Utilizing conventional electrical and electronic circuitry, the stress or strain loading, e.g., the weight on a given cell and the stress or loads on several cells can be summed algebraically to provide an overall weight for a load supported on several cells. Load cells may be used as structural support members for heavy loads, as well as for measuring the weight of such loads, when used with appropriate circuitry.

SUMMARY OF THE INVENTION

It is an object of the present invention to provide a system for the combined weighing and dumping of trailers, wherein the requirement for clearance between various elements of the dumping and weighing apparatus during weighing of a trailer is eliminated.

It is a further object of the present invention to provide a trailer weighing and dumping system which accurately weighs loaded trailers or other carriers, irrespective of the placement of center of gravity of such carriers when positioned on a lift.

It is also an object of the present invention to eliminate excessive wear on elements of a combination weighing and dumping system which result from maintaining clearance between elements of the system.

It is a further object of the present invention to simplify the weighing operation in a combination weighing and dumping system for truck trailers and the like by eliminating the need for ensuring that clearance is maintained in the system during weighing of the trailer.

Accordingly, I have provided a trailer weighing and dumping system comprising: a supporting base; a first lift supporting and load sensing device adapted to sense both tension and compression loads, supported upon the base; a tiltable lift positioned above the base, hingedly attached to the first lift supporting and load sensing device and adapted to support a truck trailer; a second lift supporting and load sensing device adapted to sense compression loads, supported upon the base below the lift; an hydraulic cylinder and piston connected between the second lift supporting and load sensing device and the side of the lift; and means for extending and retracting the piston with respect to the cylinder in order to pivotally raise and lower the lift at the rear end thereof to dump the contents of the trailer therefrom.

Other objects, advantages and embodiments of the present invention are set forth in the following description of the drawings and detailed description of the invention.

BRIEF DESCRIPTION OF THE DRAWINGS

FIG. 4 is a sectional view taken along lines 4—4 of FIG. 1;

DESCRIPTION OF THE PREFERRED EMBODIMENT

Figure 1:
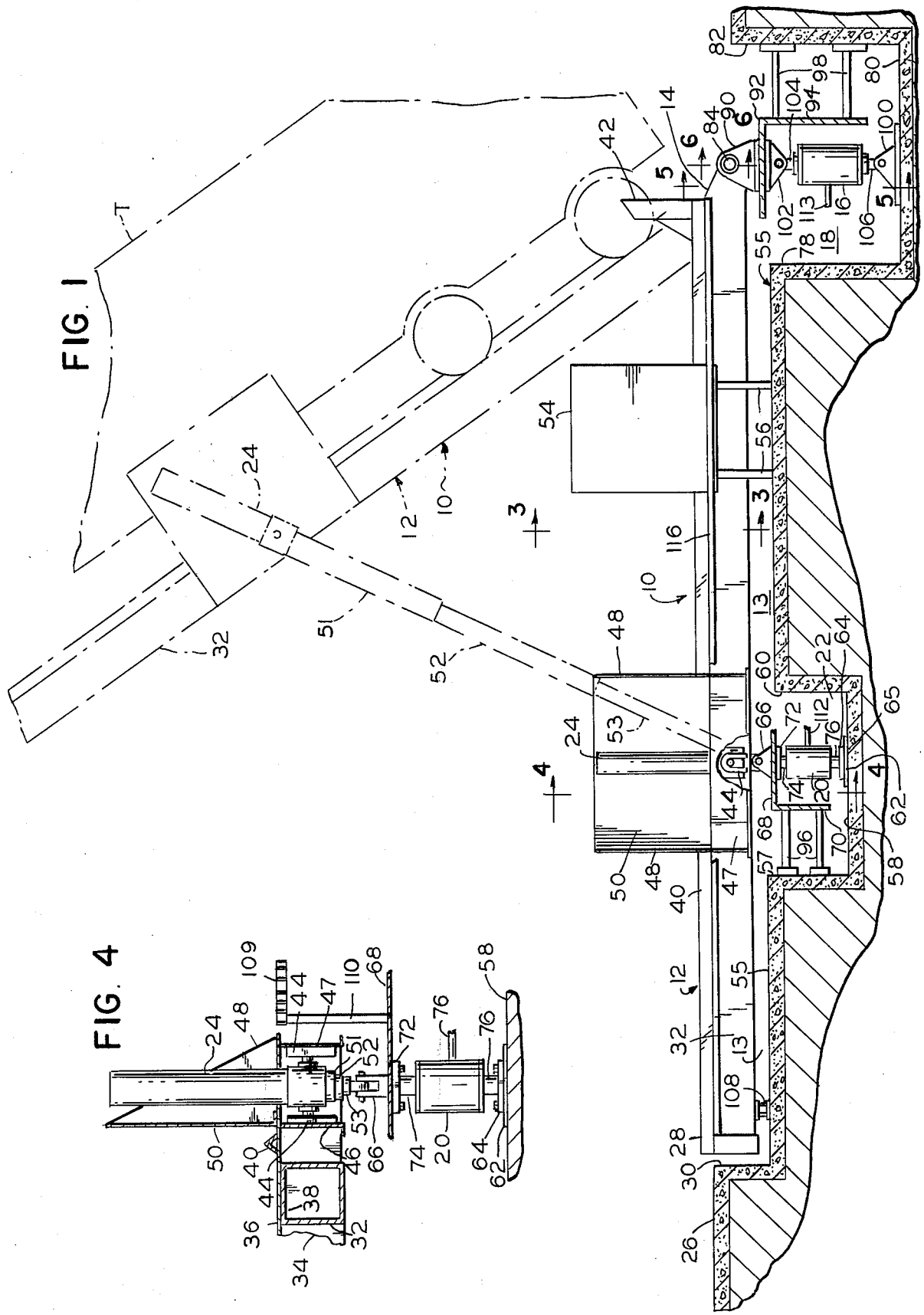
FIG. 1 is a side elevational view of a trailer weighing and dumping system constructed according to one embodiment of the present invention, with the lift thereof being shown in its elevated position using dotted lines.
Figure 2:
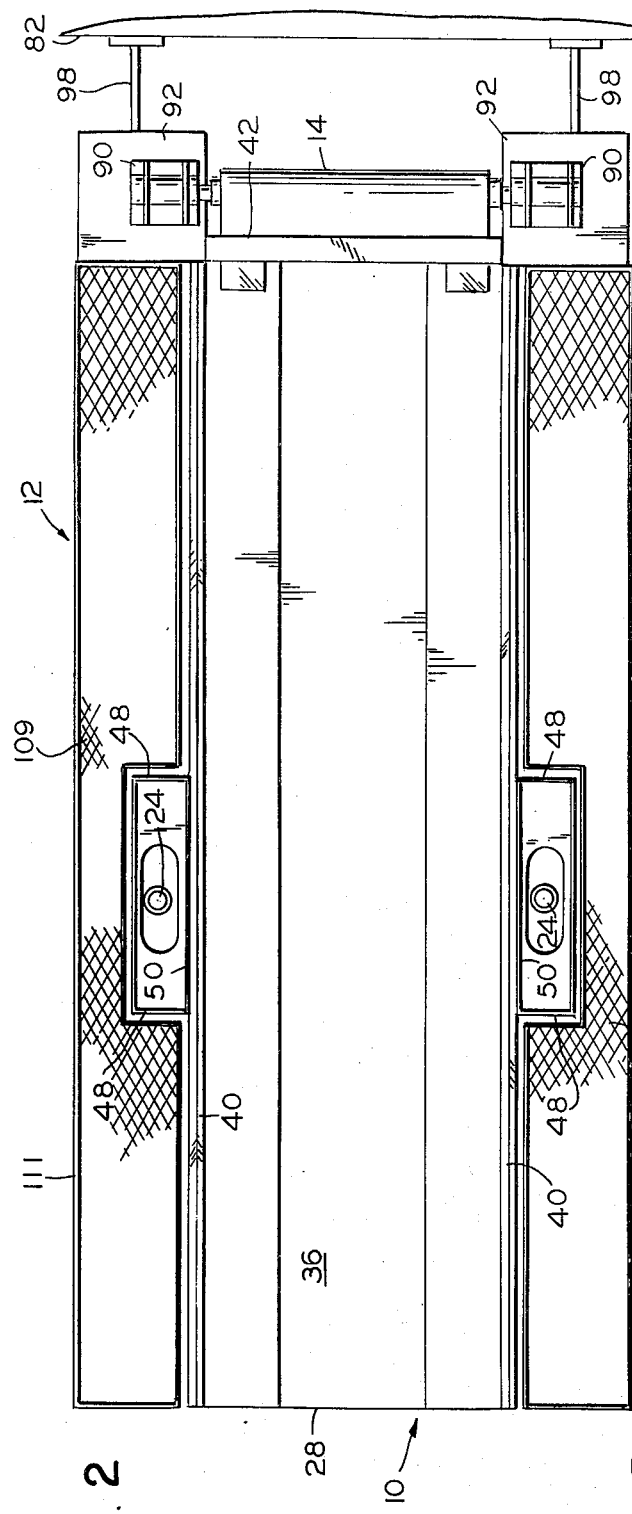
FIG. 2 is a plan view of the apparatus shown in FIG. 1.
Figure 6:
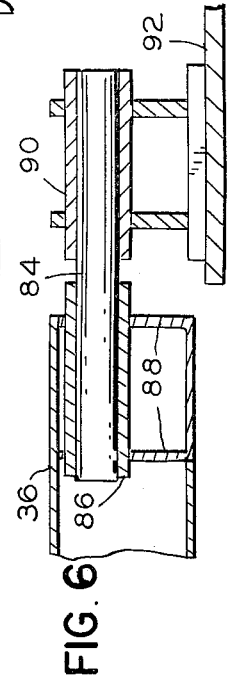
FIG. 6 is a sectional view taken along lines 6—6 of FIG. 1.

Referring to the drawings, particularly to FIGS. 1 and 2, there is shown a trailer weighing and dumping system 10, preferably used in handling relatively elongated trailers, which comprises a lift 12 positioned within a pit 13. Lift 12 is supported at its back or pivot end 14 by two load cells 16, positioned in well 18 within pit 13 and further supported at both its sides by two load cells 20, positioned in another well 22 within pit 13 beneath two hydraulic cylinders and pistons 24 used to tilt lift 12, all of which are described in greater detail below.

Figure 3:
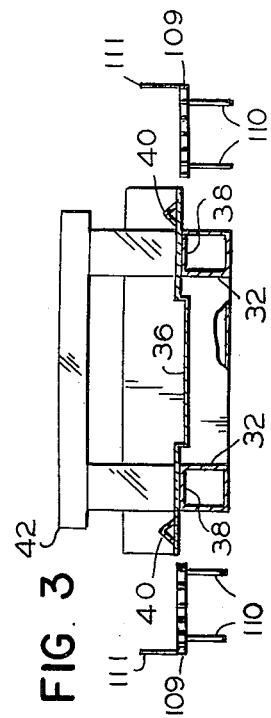
FIG. 3 is a sectional view taken along lines 3—3 of FIG. 1.
Figure 7:
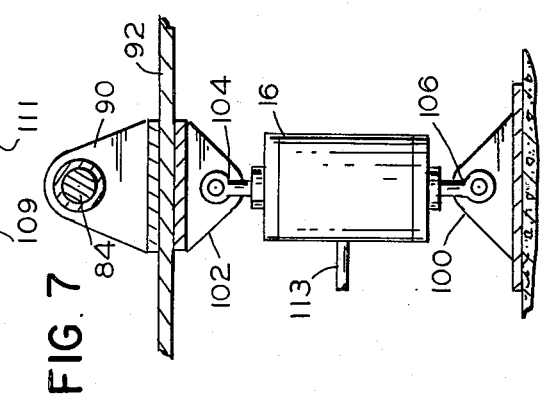
FIG. 7 is a sectional view taken along lines 7—7 of FIG. 5.
Figure 5:
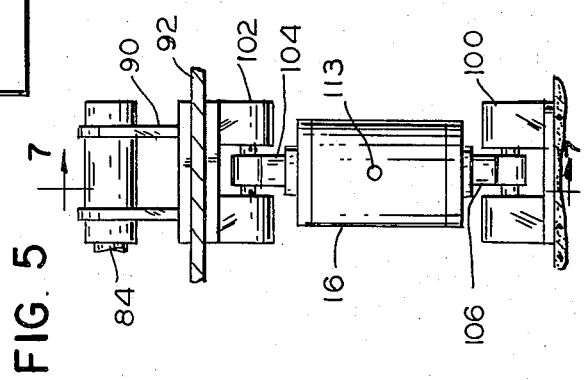
FIG. 5 is a sectional view taken along lines 5—5 of FIG. 1.

A vehicle approach ramp 26 is shown adjacent the front or approach end 28 of lift 12, which abuts front wall 30 of pit 13. Lift 12 is constructed from two longitudinally disposed box beams 32, joined together by cross beams 34 (see FIGS. 3 and 4). Box beams 32 are spaced apart laterally a distance essentially equal to the transverse distance between the wheels of a trailer T when it is positioned thereon. A deck plate 36 is joined to the upper surfaces 38 of box beam 32. Tire guide rails 40 are welded to the upper surface of deck plate 36 for rapid positioning of the wheels of trailer T on it directly above box beam 32. Bumper 42 is attached to the rear end 14 of lift 12 for holding trailer T on lift 12 when it is tilted to a dumping position.

The pair of hydraulic cylinders 24 are attached one to each side of the lift 12. Cylinders 24, which are self-centering, are mounted between two universal type U-shaped trunnion mountings 44, fixed to stringers 46 and 47, running between cross beams 34 exterior to box beams 32 (see FIG. 4). The load from each of the outermost stringers 47 is transferred by transversely extending triangular plates 48 to longitudinally extending plates 50 and from them inwardly to stringers 46, cross beams 34 and box beams 32. Disposed within each of the hydrauilc cylinders 24 are three cylinder barrels 51, 52 and 53, which function as telescoping pistons. A conventional hydraulic power unit 54, containing an electric motor, hydraulic pump and oil reserve tank, is supported on the floor 55 of pit 13 by struts 56. Hydraulic unit 54 is employed to supply hydraulic fluid to the cylinder 24 for tilting lift 12.

Although hydraulic cylinders and pistons 24 and hydraulic power unit 54 are utilized in the preferred embodiment depicted in FIGs. 1–8, any suitable extensible means for tilting lift 12, such as screw jacks, etc., may be used in a like manner in place of hydraulic cylinder 24. Likewise, any means for effecting extension of such equivalent extensible means to raise lift 12 may be substituted for hydraulic power unit 54. For example, an electrical motor or other suitable power source may be connected to a screw jack to replace the hydraulic tilting apparatus depicted.

Well 22, situated within pit 13 below cylinders and pistons 24, has a front wall 57, floor or base 58 and rear wall 60. Within well 22, mounting plates 62 are positioned upon concrete floor 58 directly under trunnion mountings 44. Bearing plates 64 are bolted upon mounting plates 62. Directly above bearing plates 64, cylinder barrels 53 are pivotally attached to brackets 66, which are welded one to each of a pair of horizontally extending guard plates 68. Guard plates 68 have vertical extension plates 70 attached to the front edges thereof. Attached to the bottom side of guard plates 68, spaced directly above bearing plates 64, are bearing plates 72. Bearing plates 64 and 72 each have cylindrical mounting recesses in the centers thereof. Lift 12 is supported beneath cylinder barrels 53 by suitable supporting members which have the capacity both to support lift 12 under the weight of a loaded vehicle and also include means for measurably sensing the dimensions of loading thereon. The preferred supporting members including load sensing means for use in the present invention are load cells 20, two of which are mounted vertically between bearing plates 72 and bearing plates 64 at the sides of lift 12 by emplacement of their upper extending members 74 and lower extending members 76 in the mounting recesses of bearing plates 72 and 64, respectively. In this manner, load cells 20 are utilized as structural support members, supporting lift 12 below hydraulic cylinders and pistons 24 on floor 58.

The structurally supporting members utilized to support lift 12 below cylinder barrels 53 in the system of this invention must be capable of supporting compressional loads thereon and must include load sensing means capable of sensing compression type loads thereon. The preferred load cells utilized in the embodiment shown in FIGS. 1–8 are conventional strain gauge type electronic load cells. Suitable strain guage type load cells for use in the system of the present invention are, for example, 100,000 pound capacity C and S precision compression type strain gauge load cells manufactured by Revere Corporation of America, Wallingford, Connecticut.

Beneath the rear or pivot end 14 of lift 12, the well or recess 18 has a front wall 78, a base or floor 80 and a rear or back wall 82. Lift 12 is provided near rear end 14 with a pair of laterally extending pivot pins 84, supported in sleeves 86 which are, in turn, welded to support plates 88 (see FIG. 6). Two trunnions 90 are mounted on two horizontal guard plates 92 for receiving the outstanding end of the pins 84, to form a hinge or pivot structure for tilting lift 12 to dump trailer T.

Previously known trailer weighing-dumping systems require substantial clerance between hinge elements equivalent to pins 84 and trunnions 90. The clearance has been necessary to allow accurate determination of the weight of a lift and a trailer. If any part of the weight of the lift and trailer rested on, for example, the trunnion elements (equivalent to trunnions 90) of a hinge element of a lift through support elements on the lift (equivalent to pins 84), then a portion of the weight of a trailer and lift would not have been transmitted to the weighing devices used by such prior systems. In contrast, the present weighing-dumping system obviates the requirement in such prior systems for maintenance of clearance between hinge elements equivalent to pins 84 and trunnions 90 by the use of load cells 16 as lift supporting members having load sensing means therein to replace the scale members and the dumping support members used at the pivot ends of lifts in prior systems.

Guard plates 92 have vertical plates 94 extending downwardly from the back edges thereof. Front end check stays 96 and back end check stays 98 are attached to the front surfaces of vertical plates 70 and to the rear surfaces of vertical plates 94, respectively. They are employed to prevent horizontal movement of lift 12 without restricting its vertical movement. Check stays 96 movably abut wall 57 and check stays 98 movably abut wall 82.

In well 18, two brackets 100 are fixed upon the floor 80 spaced directly below pins 84 and trunnions 90 at the sides of lift 12. Two brackets 102 are attached to the undersides of guard plates 92 directly below trunnions 90. The rear or pivot end 14 of lift 12 is supported by lift supporting members adapted to support either tensional loads or compressional loads thereon and including load sensing means adapted for sensing either tensional loads or compressional loads thereon. Preferred for use in the present system are electronic, strain gauge type load cells such as load cells 16. However, any suitable type of lift support and load sensing member capable of supporting the rear end of lift 12 under the weight of lift 12 and a loaded trailer, and also including means for measurably sensing the amount of a load or weight placed thereon, may be used as the lift support member on the rear or pivot end 14 of lift 12 in the present system. Unlike the support members utilized in connection with the extensible means, such as load cells 20, used with hydraulic cylinder and pistons 24, the lift support and load sensing members used at the pivot end 14 of lift 12 must be capable of supporting both tension loading and compression loading thereon, as do load cells 16. Likewise, support members and load sensing means suitable for use in the system, such as load cells 16, must be capable of measurably sensing both compression type loading and tension type loading thereon. Strain gauge type, electronic load cells, such as load cells 16, are preferred for use in the system. An example of suitable tensioncompression type load cells which may suitably be used to provide lift support members having load sensing means therein for the use shown for load cells 16, are 100,000 pound capacity C and S precision universal type strain gauige electronic load cells manufactured by Revere Corporation of America, Wallingford, Connecticut.

The two tension-compression type load cells 16 are mounted between brackets 102 and brackets 100 by means of the upper extending members 104 and lower extending members 106, respectively, of load cells 16. The extending members 104 and 106 have appropriate openings therein for securing them to brackets 102 and 100. Load cells 16 are thus adapted to structurally support the back end 14 of lift 12, irrespective of whether a compressional load or a tensional load is placed on them.

When a load is placed on lift 12 which exerts a force with its center of gravity forwardly of the supporting trunnion mountings 44 and front end load cells 20, a moment force or torsional force is created about trunnion mounting 44. An upward or tensional load is thereby transmitted to load cells 16 by pins 84 at the back end 14 of lift 12, while a compressional load is placed on load cells 20 beneath supporting trunnion mountings 44.

When lift 12 is in its generally horizontal, untilted position, its front end portion rests on lift support members 108, mounted upon the floor 56 of pit 13 under the front portion of lift 12. Support members 108 support lift 12 beneath box beams 32 during positioning of trailer T on lift 12. Lift 12 is freely movable horizontally with respect to support members 108 to accommodate changes in the length of lift 12 resulting from temperature caused expansion and contraction of lift 12, etc.

Weighing-dumping system 10 also includes two catwalks 109 placed on either side of lift 12. Catwalks 109 are supported on floor 56 by struts 110. Catwalks 109 also include handrails 111 (see FIG. 3).

Figure 8:
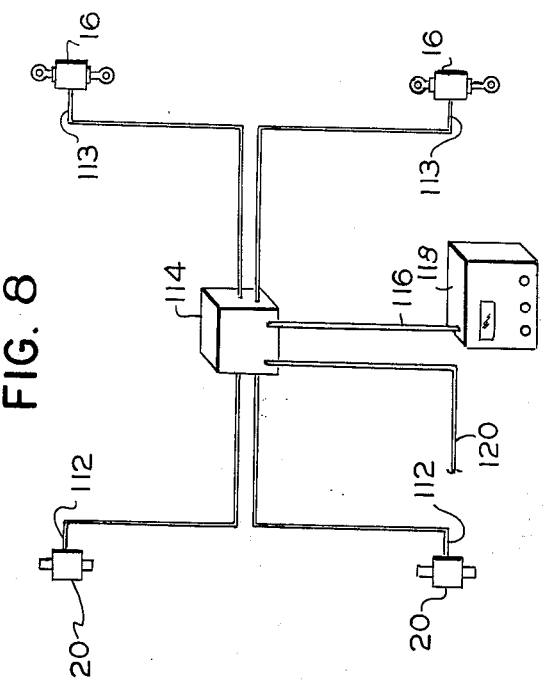
FIG. 8 is an illustration of the electrical conduits and electronic apparatus employed and the embodiment of the invention shown in FIG. 1.

Measurement of the loads on load cells 20 and load cells 16 is undertaken by the use of conventional electrical and electronic circuitry. Electrical leads to and from load cells 20 are encased, for protection, in lead conduits 112. Electrical leads to and from load cells 16 are protected by lead conduits 113. Referring to FIG. 8, electrical lead conduits 112 and 113 extend to junction box 114. Leads from junction box 114 extend though conduit 116 to electronic weight calculating and readout apparatus 118. Apparatus 118 is of a conventional type which measures the changes in resistance of load cells 16 and 20 to the passage of electrical current therethrough based on changes in their loading and then converts the measurements received from the four load cells into the desired weight figure for the trailer being weighed. The weight figure is then shown upon an attached or included readout device. Appropriate electrical circuitry and electronic weight calculating and readout apparatus for use with particular load cells or other equivalent lift supporting and load sensing members used in accordance with the present invention will be apparent to those skilled in the art. for example, a suitable electronic weight calculating and readout apparatus for use with the strain gauge type electronic load cells preferred for use in the present invention is a Model 4000 Digital Weigher manufactured by Streeter Amet Division of Mangood Corporation Grayslake, Ill. The electrical system of weighing-dumping apparatus 10 is connected to conventional electric power source, not shown, by leads in lead conduit 120.

Operation of the weighing-dumping system shown in FIGS. 1–8 is undertaken by backing a loaded trailer onto lift 12 from approach ramp 26 with lift 12 in a generally horizontal, untilted position supported on front end supports 108 until the back end of trailer T contacts bumper 42. After trailer T has been positioned on lift 12, the landing wheels of trailer T, if any, are lowered to contact deck 36. Unhitching of trailer T from the truck used to back it onto lift 12 is facilitated by slightly raising lift 12 in order to raise trailer T off the hitching gear of the truck when deck 36 contacts the trailer's landing wheels or its floor structure. The truck is then driven out from under the front end of trailer T. With lift 12 in this slightly elevated position, spaced above support members 108, the weight of the loaded trailer is then obtained using weight calculation and readout apparatus 118. An electric limit switch is preferably connected into hydraulic unit 54 so that lift 12 is always stopped in exactly the same slightly tilted position for weighing. The limit switch is preferably interconnected with weight calculation apparatus 118 to prevent weighing unless lift 12 is in this slightly tilted position. With lift 12 thus spaced from front end support members 108, the load cells 20 and 16 are the sole structural members supporting the weight of lift 12 and any trailer thereon. The total weight of lift 12 and trailer T is thus fully on the weight sensing elements, i.e., load cells 20 and 16 of the weighing system.

Once the weight of the loaded trailer has been obtained from weight calculation and readout apparatus 118, lift 12 and trailer T are tilted to a dumping position, as shown by the dotted lines in FIG. 1 to dump the load from trailer T through its end gates. When the contents of trailer T have been dumped over the back end 14 of lift 12, lift 12 is lowered to the slightly tilted position, spaced from front end supports 108. The weight of trailer T and lift 12 is once again obtained from apparatus 118 without the need for maintaining clearance between the dumping support elements of the system and the weight sensing elements of the system. After the weight of the empty trailer has been obtained, lift 12 is fully lowered to its generally horizontal position, partially resting upon front end support members 108.

When the center of gravity of trailer T on lift 12 is between approach ramp 26 and trunnion mountings 44, an upward of tensional force is exerted on the lift supporting structure of system 10 at the back end 14 of lift 12. This results from the moment or torsional force generated about trunnion mountings 44, which is transmitted to load cells 16 through pins 84, trunnions 90, guard plates 92 and brackets 102. In weighing systems using conventional calibrated scales, it would be difficult, if not impossible, to combine compressional loads of the type placed on load cells 20 with tensional loads of the type placed on load cells 16 when the center of gravity of the load on lift 12 is forward of trunnion mountings 44. In contrast, an accurate weight is easily obtained in the system of the present invention when the tensional-compressional load cells 16 are employed below the rear or pivot end 14 of lift 12. By the system of this invention, the weight of a trailer T can be determined just as simply when the center of gravity of the trailer on lift 12 is forward of trunnion mountings 44 as it can when the center of gravity is located between trunnion mountings 44 and the back end 14.

Figure 9:
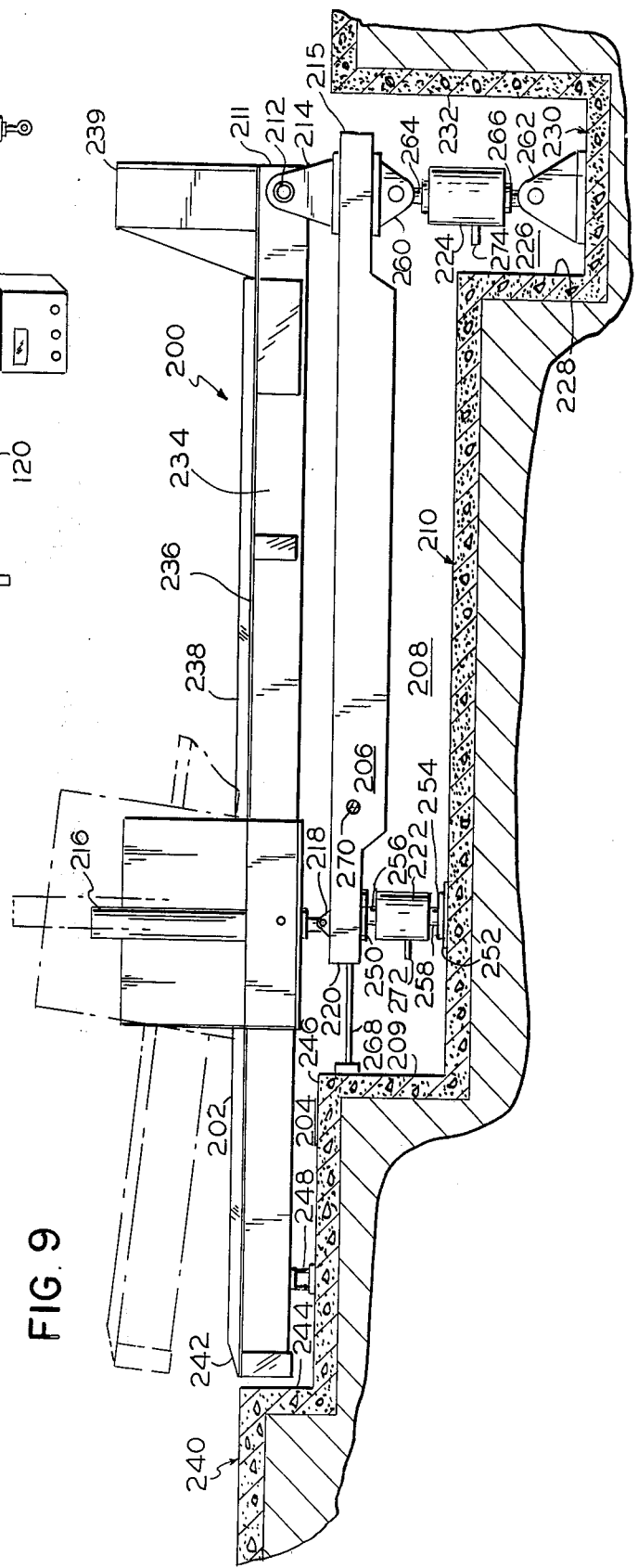
FIG. 9 is a side elevational view of another embodiment of the present invention.

FIG. 9 illustrates another embodiment of the trailer weighing and dumping system of this invention, which is preferably employed when dumping and weighing compact, short trailers. System 200 includes a lift 202 which is positioned in a pit 204. Two laterally spaced weighbridges 206 are positioned below the central and rear portions of lift 202 within a well 208 in pit 204. Well 208 has a front wall 209 and floor 210. Lift 202 is supported at its pivot end 211 by two laterally extending pivot pins 212, which fit into trunnions 214, mounted on weighbridges 206 at their back ends 215. Extensible means comprising two hydraulic cylinders and pistons 216, fixed one to each side of lift 202, are attached to brackets 218, mounted on weighbridges 206 near their front ends 220. Cylinders and pistons are connected to extending means including a hydraulic power unit (not shown). Weighbridges 206 are supported at their front ends by two compression type load cells 222 and at their back ends by two tensioncompression type load cells 224. Load cells 224 extend into another well 226, having a front wall 228, a base or floor 230 and a rear wall 232.

Lift 202 comprises two box beams 234, having a deck plate 236 attached to the upper sides thereof and having tire guides 238 thereon. Lift 202 also has a bumper 239 at the rear end 211 thereof to retain a trailer on lift 12 when it is in a tilted position.

System 200 employs a concrete vehicle approach ramp 240 adjacent the front or approach end 242 of lift 202. Pit 204 has a front wall 244 and a floor or base 246. Near the front end 242 of lift 202 are lift support members 248, positioned on base 246 beneath box beams 234 to support lift 202 when it is in a generally horizontal, untilted position. Lift 202 is freely movable horizontally with respect to members 248 to accommodate changes in its length.

Bearing plates 250 are attached to the bottom side of the weighbridges 206 near the front ends 220 thereof. Mounting plates 252 are positioned on floor 210 directly below bearing plates 250. Bearing plates 254 are bolted upon mounting plates 252 directly below bearing plates 250. Bearing plates 250 and 254 have substantially cylindrical mounting recesses in the centers thereof. The two compression load type, strain gauge, electronic load cells 222, utilized as the structural supporting members having load sensing means therein in the embodiment of the invention shown in FIG. 9, are mounted vertically between bearing plates 250 at their top ends and bearing plates 254 at their bottom ends by placement of their respective upper extending members 256 and lower extending members 258 in the appropriate mounting recesses in bearing plates 250 and 254.

Weighbridges 206 each have trunnions 214 fixed on the upper surfaces of the rear portions thereof for holding the two laterally extending pins 212. There is substantially no clearance between pins 212 and trunnions 214 when they are fitted together to form the hinge or pivot element used in tilting lift 202. As explained above in connection with the embodiment of the invention shown in FIGS. 1–8, the need for clearance between hinge elements, such as pins 212 and trunnions 214, which is found in prior combination weighing-dumping devices, is eliminated by the system of the present invention. Wear on pins 212 and trunnions 214 is thereby substantially reduced compared with such previous systems.

Weighbridges 206 are provided, on their bottom sides near their rear ends 211, with brackets 260. Positioned below brackets 260 on floor 230 are brackets 262. Upper brackets 260 and lower brackets 262 are adapted to pivotally secure the upper extending members 264 and the lower extending members 266, respectively, of tension-compression type load cells 224, utilized, in the embodiment of the invention shown in FIG. 9, as the structural supporting members including load sensing means adapted for supporting and sensing either tensional or compressional loads thereon. Load cells 224 thus act as structural support members for the back end 211 of lift 202 irrespective of whether the load exerted on them by back end 211 is compressional or tensional. When a load is placed on lift 202 with its center of gravity between front end 242 and brackets 218, a tensional load is transmitted through pins 212 and trunnions 214 to load cells 224. This is the result of the moment or torsional force generated about brackets 218. Simultaneously, a compressional load is placed on front load cells 222 below brackets 218.

Weighbridges 206 are provided with conventional check stays at one end such as check stays 268 at the front ends 220 of weighbridges 206, which are journaled into walls 209 for free vertical movement, and with a lateral check stay such as check stay 270, journaled into the lateral wall of well 208 (not shown) for free vertical movement. The check stays 268 and 270 prevent horizontal movement of weighbridges 206 when lift 202 is tilted.

Load cells 222 and 224 are connected to a standard electrical power source and to conventional electronic weight calculation and readout apparatus (not shown) by way of electrical leads in lead conduits 272 and 274.

The operation of the embodiment of this invention shown in FIG. 9 is undertaken in substantially the same manner as described above in connection with the embodiment shown in FIGS. 1–8.

In the foregoing description, the invention has been described with reference to particular preferred embodiments. It is to be understood that the specific details shown and described above are merely illustrative. For example, the apparatus of the present invention may be utilized, with obvious appropriate modifications, in dumping and weighing a variety of other carriers, such as railroad cars having end opening gates.

I claim:

1. In combination:
    a supporting base adapted to support the weight of a loaded vehicle;
    a lift positioned above said base, adapted to support a loaded vehicle and to tilt the loaded vehicle from a generally horizontal position to a tilted position;
    a first lift supporting member positioned on said base below said lift, adapted to support either tensional loads or compressional loads thereon, and including load sensing means adapted for sensing either tensional loads or compressional loads thereon;
    a hinge means operatively connecting said first lift support member to said lift;
    a second lift supporting member positioned on said base below said lift, adapted to support compressional loads thereon, and including load sensing means adapted for sensing compressional loads thereon;
    extensible means operatively connected between said lift and said second lift supporting member;
    means for effecting extension of said extensible means to extend the same, thereby to pivot the lift about said hinge means to tilt said vehicle; and
    means for measuring loads on said first load supporting member and said second load supporting member from the load sensing means thereof and calculating the weight of said vehicle on said lift from the measurements.

2. The combination of claim 1 further comprising a third lift support member positioned on said base below said lift, adapted for supporting said lift when said lift is in said generally horizontal position, said lift being freely movable horizontally with respect to the third lift support member.

3. The combination of claim 1 wherein said first lift supporting member is a tension-compression load sensing electronic load cell.

4. The combination of claim 1 wherein said second lift supporting member is a compression load sensing electronic load cell.

5. The combination of claim 1 wherein said extensible means comprises a piston and cylinder means, a pin on the lower end of said piston and cylinder means, and a trunnion mounted upon said second supporting member, whereby said piston and cylinder means is operatively connected with said second supporting member.

6. The combination of claim 5 further comprising check stay means rigidly connected to said trunnion, whereby said lift and said second support member are horizontally fixed.

7. The combination of claim 1 wherein said hinge means comprises:
    a pin attached to said lift; and
    a trunnion fixed to said first load sensing means.

8. The combination of claim 7 further comprising check stay means rigidly connected to said trunnion, whereby said lift and said first supporting member are horizontally fixed.

9. The combination of claim 7 wherein said trunnion has an opening of substantially the same size as the diameter of said pin, whereby said pin is fitted snugly and rotatably into the opening of said trunnion.

10. In combination:
    a supporting base adapted to support the weight of a loaded vehicle;
    a weighbridge positioned above said base;
    a first weighbridge supporting member adapted to support either tensional loads or compressional loads thereon, the bottom thereof being attached to said base and the top thereof being attached to a first end of said weighbridge, including load sensing means adapted for sensing either tensional loads or compressional loads thereon;
    a second weighbridge supporting member adapted to support compressional loads thereon, the bottom thereof being positioned on said base and the top thereof being attached to a second end of said weighbridge, including load sensing means adapted for sensing compressional loads thereon;
    a lift positioned above said weighbridge, adapted to support a loaded vehicle and to tilt the loaded vehicle from a generally horizontal position to a tilted position;
    a hinge means operatively connecting said first end of said weighbridge with said lift;
    an extensible means operatively connected between said second end of said weighbridge and said lift operable to extend and thereby to pivot said lift about said hinge means and tilt said vehicle; and
    means for measuring loads on said first weighbridge supporting member and said second weighbridge supporting member from the load sensing means thereof and calculating the weight of said vehicle on said lift from the measurements.

11. The combination of claim 10 further comprising a lift support member mounted on said base below said lift for supporting said lift when said lift is in said generally horizontal position, said lift being freely movable horizontally with respect to said lift support member to accommodate changes in the length of said lift.

12. The combination of claim 10 further comprising a first bracket mounted on the first end of said weighbridge whereby said first weighbridge supporting member is pivotally attached to said first end of said weighbridge.

13. The combination of claim 10 further comprising a second bracket mounted on said base below said first weighbridge supporting member, whereby said first weighbridge supporting member is pivotally attached to said base.

14. The combination of claim 10 wherein said extensible means comprises cylinder and piston means, a pin on the lower end of said cylinder and piston means and a trunnion mounted on said weighbridge below said cylinder and piston means, whereby said cylinder and piston means is pivotally connected with said weighbridge.

15. The combination of claim 10 further comprising check stay means rigidly connected to said weighbridge, whereby said weighbridge and said lift are horizontally fixed.

16. The combination of claim 10 wherein said first weighbridge supporting member is a tension-compression load sensing electronic load cell.

17. The combination of claim 10 wherein said second weighbridge supporting member is a compression load sensing electronic load cell.

18. The combination of claim 10 wherein said hinge means comprises:
a pin attached to said lift; and
a trunnion mounted on said first end of said weighbridge.

19. The combination of claim 18 wherein said trunnion has an opening of substantially the same size as the diameter of said pin, whereby said pin is fitted snugly and rotatably into the opening of said trunnion.

* * * * *